United States Patent Office 2,767,287

Patented Oct. 16, 1956

2,767,287

ELECTRODE FOR CRYSTALLINE NEGATIVE RESISTANCE ELEMENTS

George J. Kahan, Williamstown, Mass., assignor to Sprague Electric Company, North Adams, Mass., a corporation of Massachusetts No Drawing. Application December 31, 1952, Serial No. 329,148

4 Claims. (Cl. 201—63)

This invention relates to electronic circuiting and particularly to semiconductor electrical components. More specifically, the invention relates to a novel electrode contact for connection to a semiconductor crystalline body, particularly such crystalline matrices as are conventionally used in the transistor art including germanium, silicon, silicon-carbide and diamond crystalline structures, as well as mixed crystals and oxide film-type rectifier components.

It has long been a problem in the transistor field to provide suitable connections to semiconductor crystalline structure which would operate with desirable characteristics. In particular, one of the primary problems encountered has been an inability to eliminate or substantially reduce the noise ratio inherent in circuits utilizing a semiconductor component as a negative resistance element therein due to the fact that the lead connections with such component function as inherent noise generators.

Among the prior attempts which have been made to eliminate this difficulty has been the use of a fusing or welding procedure in which the lead connections are welded to the surface of the crystal by fusing an end of the lead to the crystalline surface. Other attempts have been made in which the crystalline structure has been locally melted and a metallic electrode pressed into the soft or melted portion of the crystal and held there until the crystal solidified around it. All of these prior attempts, which have only been partially successful in reducing the noise ratio, have produced undesirable characteristics in the completed unit in that the fusing or welding process or the local melting of the crystalline matrix alter the character of the semiconductor in the region of the connected electrode, resulting in an undesirable departure from the theoretical and/or calculated performance characteristics.

The instant invention accordingly has for its primary purpose the production of a low noise ratio electrode connection to semiconductor electronic components which will avoid the above-noted difficulty. Another primary object of the instant invention is to provide a conductive lead connection to a semiconductor crystalline matrix which is easy to form, will not disturb the characteristics of the crystalline matrix, and which will perform successfully under extreme operating conditions. Other and distinct features will become apparent from a study of the following description and claims.

The present invention contemplates the forming of a conductive lead connection to such semiconductor circuit components by using conventional type dental alloys as the lead element. Dental alloys are noted for their simplicity, the ease with which they may be handled, and their speed of setting up. These alloys are also characterized by a less frequently considered characteristic in that they are good electrical conductors.

According to the broad concept of the invention, the desired junction with the semiconductor matrix may be easily obtained by applying a dental alloy or amalgam thereto while the same is in an unset condition (i. e., while relatively soft and deformable), maintaining a relatively slight pressure between the amalgam and the crystalline matrix, and allowing the former to set up or harden. One of the unexpected features of such process is the high tenacity with which the dental alloy adheres to the crystalline matrix without the necessity of exerting large compressive force across the mating surfaces thereof, since the high plasticity of the alloy allows it to form an exact replica of the crystalline matrix, reproducing exactly all the fine detal of the etched surface and thus, by mechanically interlocking with the base matrix, gives mechanical and electrical strength to the contact. Another unexpected advantage resides in the extremely low noise generated by the contact junction, the theoretical reasons for which are not wholly understood.

One particular alloy or amalgam which has been found extremely successful in practice is one which has the following composition:

| Ingredient: | Percentage (by weight) |
|---|---|
| Silver, approximately | 33 |
| Tin | 12.5 |
| Copper | 2 |
| Zinc, approximately | .5 |
| Mercury | 52 |

Other examples of alloys which may also be used are listed in the Bureau of Standard's Circular, C433 (1942). These alloys will generally comprise a mixture of particles of diverse metallic or metal alloy powders, plus mercury as a binder material. In particular, preferred forms of the invention will incorporate substantial amounts of silver in the alloy amalgam.

As many apparently widely different embodiments of this invention may be made without departing from the spirit and scope hereof, it is to be understood that the above invention is not limited except as defined in the appended claims.

What is claimed is:

1. An electronic circuit component comprising a crystalline negative resistance element having a surface and an electrical lead firmly affixed to said surface, said lead comprising an in situ hardened and solidified mass of about 33% silver, about 12.5% tin, about 2% copper, about 0.5% zinc, all by weight, the balance being essentially mercury.

2. An electronic circuit component comprising a crystalline semiconductor and an electrical lead firmly affixed to the surface of said semiconductor, said lead comprising an in situ hardened and solidified dental amalgam consisting essentially of silver, tin, zinc, copper and mercury.

3. A process for forming an integrally attached electrode element on the surface of an electrical component comprising, contacting said surface with a dental amalgam while the latter is in an unset and deformable condition, and maintaining a slight pressure between the amalgam and the surface for a period of time sufficient to cause the amalgam to set up and harden.

4. An electronic circuit component comprising n crystalline matrix surface and an electrical lead firmly affixed to said surface, said lead comprising an in situ hardened and solidified dental amalgam.

References Cited in the file of this patent

UNITED STATES PATENTS 2,491,879 Teague ---------------- Dec. 20, 1949